(12) United States Patent
Krueger et al.

(10) Patent No.: US 8,315,751 B2
(45) Date of Patent: Nov. 20, 2012

(54) METHODS, PROGRAM PRODUCTS, AND SYSTEMS FOR CONTROLLING BRAKING IN A HYBRID VEHICLE

(75) Inventors: Eric E. Krueger, Chelsea, MI (US); Matthew M. Karaba, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1301 days.

(21) Appl. No.: 12/040,352

(22) Filed: Feb. 29, 2008

(65) Prior Publication Data

US 2009/0222156 A1     Sep. 3, 2009

(51) Int. Cl.
*B60L 15/00*     (2006.01)

(52) U.S. Cl. ............................................. 701/22; 303/15

(58) Field of Classification Search .................... 701/22, 701/70, 51, 83, 71; 303/15, 152, 155; 180/6.28, 180/6.44, 53.5, 65.1, 65.21, 400, 338, 345
See application file for complete search history.

(56) References Cited

U.S. PATENT DOCUMENTS

| | | | |
|---|---|---|---|
| 5,433,512 A * | 7/1995 | Aoki et al. ..................... 303/3 |
| 5,511,859 A * | 4/1996 | Kade et al. ..................... 303/3 |
| 7,409,280 B2 * | 8/2008 | Nakamura et al. ............. 701/70 |
| 7,472,766 B2 * | 1/2009 | Yamamoto et al. .......... 180/65.1 |

\* cited by examiner

*Primary Examiner* — Dalena Tran
(74) *Attorney, Agent, or Firm* — Ingrassia Fisher & Lorenz, P.C.

(57) ABSTRACT

A method for controlling braking in a hybrid vehicle includes the steps of determining a value of a variable pertaining to operation of the hybrid vehicle and applying regenerative braking based at least in part on the value of the variable. The variable comprises a speed of the hybrid vehicle, a steering angle of the hybrid vehicle, or a rate of change of the steering angle.

15 Claims, 4 Drawing Sheets

METHODS, PROGRAM PRODUCTS, AND SYSTEMS FOR CONTROLLING BRAKING IN A HYBRID VEHICLE

TECHNICAL FIELD

The present invention generally relates to the field of hybrid vehicles and, more specifically, to methods, program products, and systems for controlling braking in hybrid vehicles.

BACKGROUND OF THE INVENTION

Today's hybrid vehicles use regenerative braking to recapture energy and recharge a high voltage battery used in the hybrid vehicle. This regenerative braking helps to provide improved fuel efficiency. In certain hybrid vehicles, regenerative braking is performed using front road wheels of the hybrid vehicle. In certain other hybrid vehicles, regenerative braking is performed using rear road wheels of the hybrid vehicle. In yet other hybrid vehicles with four wheel drive, regenerative braking is performed using front and rear road wheels of the hybrid vehicle.

While regenerative braking is generally helpful in improving fuel economy, in certain situations full regenerative braking may not be ideal. For example, in a hybrid vehicle in which regenerative braking is performed using front road wheels of the hybrid vehicle, full regenerative braking may not result in ideal steerability of the hybrid vehicle during sharp turns or during periods of very slow or very fast speeds. In addition, in a hybrid vehicle in which regenerative braking is performed using rear road wheels of the hybrid vehicle, full regenerative braking may not result in ideal stability or smoothness of the hybrid vehicle during sharp turns or during periods of very slow or very fast speeds. Full regenerative braking may also be less than ideal while the hybrid vehicle is being operated on road surfaces with relatively low coefficients of friction.

Accordingly, it is desirable to provide an improved method for controlling braking in a hybrid vehicle using regenerative braking, for example, during sharp turns or during periods of very slow or very fast speeds. It is also desirable to provide an improved program product for controlling braking in a hybrid vehicle using regenerative braking, for example, during sharp turns or during periods of very slow or very fast speeds. It is further desirable to provide an improved system for controlling braking in a hybrid vehicle using regenerative braking, for example, during sharp turns or during periods of very slow or very fast speeds. Furthermore, other desirable features and characteristics of the present invention will be apparent from the subsequent detailed description and the appended claims, taken in conjunction with the accompanying drawings and the foregoing technical field and background.

SUMMARY OF THE INVENTION

In accordance with an exemplary embodiment of the present invention, a method for controlling braking in a hybrid vehicle is provided. The method comprises the steps of determining a value of a variable pertaining to operation of the hybrid vehicle and applying regenerative braking based at least in part on the value of the variable. The variable comprises a speed of the hybrid vehicle, a steering angle of the hybrid vehicle, or a rate of change of the steering angle.

In accordance with another exemplary embodiment of the present invention, a program product for controlling braking in a hybrid vehicle is provided. The program product comprises a program and a computer-readable signal-bearing media. The program is configured to at least facilitate determining a value of a variable pertaining to operation of the hybrid vehicle and applying regenerative braking based at least in part on the value of the variable. The variable comprises a speed of the hybrid vehicle, a steering angle of the hybrid vehicle, or a rate of change of the steering angle. The computer-readable signal-bearing media bears the program.

In accordance with a further exemplary embodiment of the present invention, a system for controlling braking in a hybrid vehicle is provided. The system comprises a sensor and a brake controller. The sensor is configured to at least facilitate determining a value of a variable pertaining to operation of the hybrid vehicle. The variable comprises a speed of the hybrid vehicle, a steering angle of the hybrid vehicle, or a rate of change of the steering angle.

BRIEF DESCRIPTION OF THE DRAWINGS

The present invention will hereinafter be described in conjunction with the following drawing figures, wherein like numerals denote like elements, and wherein.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
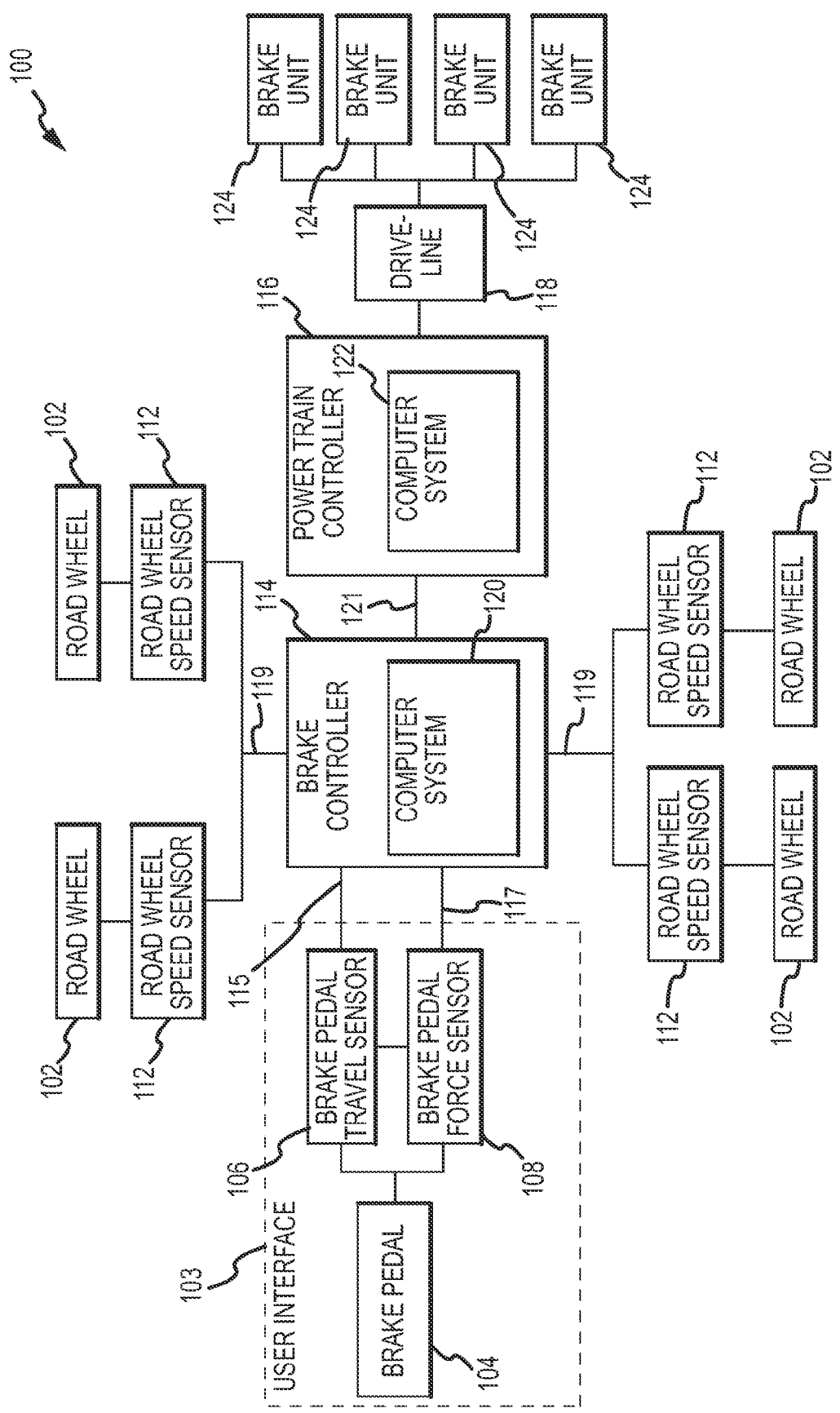
FIG. 1 is a functional block diagram of a control system for use in controlling braking in a hybrid vehicle having a plurality of road wheels, in accordance with an exemplary embodiment of the present invention.

FIG. 1 is a functional block diagram of a control system 100 for use in controlling braking in a hybrid vehicle having a plurality of road wheels 102, in accordance with an exemplary embodiment of the present invention. The control system 100 includes a user interface 103, road wheel speed sensors 112, a brake controller 114, a power train controller 116, a driveline 118, and brake units 124. In certain embodiments, one or more components of the control system 100 may vary. However, regardless of its particular form, the hybrid vehicle control system 100 can be used to implement a process for controlling braking in the hybrid vehicle, such as the exemplary embodiment of the control process described further below in connection with FIGS. 3 and 4.

In the depicted embodiment, the user interface 103 includes a brake pedal 104, a brake pedal travel sensor 106, and a brake pedal force sensor 108. The brake pedal 104 provides an interface between an operator of the hybrid vehicle and the control system 100. To initiate or request braking, the operator typically uses his or her foot to apply a force to the brake pedal 104 to move the brake pedal 104 in a generally downward direction.

The brake pedal travel sensor 106 and the brake pedal force sensor 108 are coupled to the brake pedal 104. The brake pedal travel sensor 106 provides an indication of how far the brake pedal 104 has traveled, which is also known as brake pedal travel, when the operator applies force to the brake pedal 104. In one exemplary embodiment, brake pedal travel can be determined by how far an input rod in a brake master cylinder has moved. Other methods of measuring brake travel can also be utilized. Regardless of the particular method utilized, the brake pedal travel sensor 106 collects brake pedal travel data for ultimate use by the brake controller 114 in controlling braking in the hybrid vehicle, as described further below.

The brake pedal force sensor 108 determines how much force the operator of the hybrid vehicle is applying to the brake pedal 104. This is also known as brake pedal force. In one exemplary embodiment, the brake pedal force sensor 108 may include a hydraulic pressure emulator and/or a pressure transducer, and the brake pedal force can be determined by measuring hydraulic pressure in a master cylinder of the control system 100. Other methods of determining the amount of brake pedal force can also be used. Regardless of the particular method utilized, the brake pedal force sensor 108 collects brake pedal force data for ultimate use by the brake controller 114 in controlling braking in the hybrid vehicle, as described further below.

The road wheel speed sensors 112 are coupled to the road wheels 102, and are configured to at least facilitate determining speeds of the road wheels 102. In a preferred embodiment, each of the road wheels 102 has a different road wheel speed sensor 112 coupled thereto. Also in a preferred embodiment, the road wheel speed sensors 112 determine respective values of road wheel speeds for at least two of the road wheels 102, and preferably each of the four road wheels 102 of the hybrid vehicle. The road wheel speeds for the different road wheels 102 are preferably used by the brake controller 114 in determining a hybrid vehicle speed along with a steering angle and/or a rate of change of the steering angle for the hybrid vehicle in accordance with a process, such as the exemplary embodiment of a control process depicted in FIGS. 3 and 4 and described further below in connection therewith.

The brake controller 114 is coupled to the user interface 103 and the road wheel speed sensors 112, as well as indirectly to the brake units 124 via the driveline 118 and the power train controller 116 (for regenerative braking) and also via non-depicted brake calipers and rotors (for friction braking). In the depicted embodiment, the brake controller 114 is coupled to the brake pedal travel sensor 106 and the brake pedal force sensor 108 of the user interface 103, as well as to the road wheel speed sensors 112 and the power train controller 116.

The brake controller 114 receives a first input 115 from the brake pedal travel sensor 106, namely brake pedal travel data, and a second input 117 from the brake pedal force sensor 108, namely brake pedal force data. The brake controller 114 also receives third inputs 119 from the road wheel speed sensors 112, namely road wheel speed data. The brake controller 114 uses values from the first, second, and third inputs 115, 117, and 119 to perform various calculations, comparisons, and determinations, such as calculating a hybrid vehicle speed, a steering angle, and/or a rate of change of the steering angle of the hybrid vehicle, and determining appropriate magnitudes of regenerative braking and friction braking based at least in part on these values. The brake controller 114 uses such calculations, comparisons, and determinations in at least facilitating control of braking in the hybrid vehicle. An exemplary control process that includes exemplary steps for such calculations, comparisons, and determinations is provided in FIGS. 3 and 4, and will be described further below in connection therewith.

In one preferred embodiment, the brake controller 114 uses such calculations, comparisons, and determinations in generating a brake control signal 121 pertaining to desired magnitudes of regenerative braking and friction braking. Preferably, the combined desired magnitudes of the regenerative and friction braking as determined by the brake controller 114 are equal to a total desired magnitude of braking, as may also be determined by the brake controller 114 based at least in part on the first and second inputs 115, 117 from the brake pedal travel sensor 106 and the brake pedal force sensor 108.

In the depicted embodiment, the brake controller 114 transmits the brake control signal 121 to the power train controller 116 coupled thereto. The power train controller 116 is coupled to the driveline 118, which in turn is coupled to the brake units 124. The power train controller 116 is configured to at least facilitate providing a desired amount of regenerative braking, if any, via the driveline 118 to the plurality of brake units 124 based at least in part on the brake control signal 121 from the brake controller 114. Additionally, the brake controller 114 at least facilitates providing a desired amount of friction braking, if any, via non-depicted brake calipers and rotors.

Also in the depicted embodiment, the brake controller 114 and the power train controller 116 include first and second computer systems 120, 122, respectfully. In a preferred embodiment, the first computer system 120 at least facilitates control of braking via one or more processes such as the control process of FIGS. 3 and 4 described further below. Also in certain embodiments, the second computer system 122 of the power train controller 116 at least facilitates such control of braking, for example by performing certain steps of such a control process, and/or by implementing instructions provided by the first computer system 120 (e.g., the brake control signal 121) and/or other instructions provided by one or more other, non-depicted sources.

In a preferred embodiment, the first and second computer systems 120, 122 each comprise a computer system such as the exemplary computer system depicted in FIG. 2 and described below in connection therewith. However, this may vary in other embodiments. For example, in certain embodiments, the brake controller 114 and the power train controller 116 may share one or more common computer systems or other devices. Also, in certain embodiments, such computer systems may reside physically apart from the brake controller 114 and/or the power train controller 116, among other possible variations.

The brake units 124 are coupled to the driveline 118, and are influenced at least in part thereby during regenerative braking in accordance with the brake control signal 121 provided by the brake controller 114 to the power train controller 116 and implemented by the power train controller 116 via the driveline 118. In addition, the brake units 124 are also coupled to non-depicted calipers and rotors, are influenced at least in part thereby during friction braking in accordance with the brake control signal 121 and/or other instructions, commands, or actions provided by the brake controller 114. The brake units 124 can include any number of different types of devices that, upon receipt of brake commands, can apply the proper magnitude of regenerative and/or friction braking in accordance with such demands.

Figure 2:
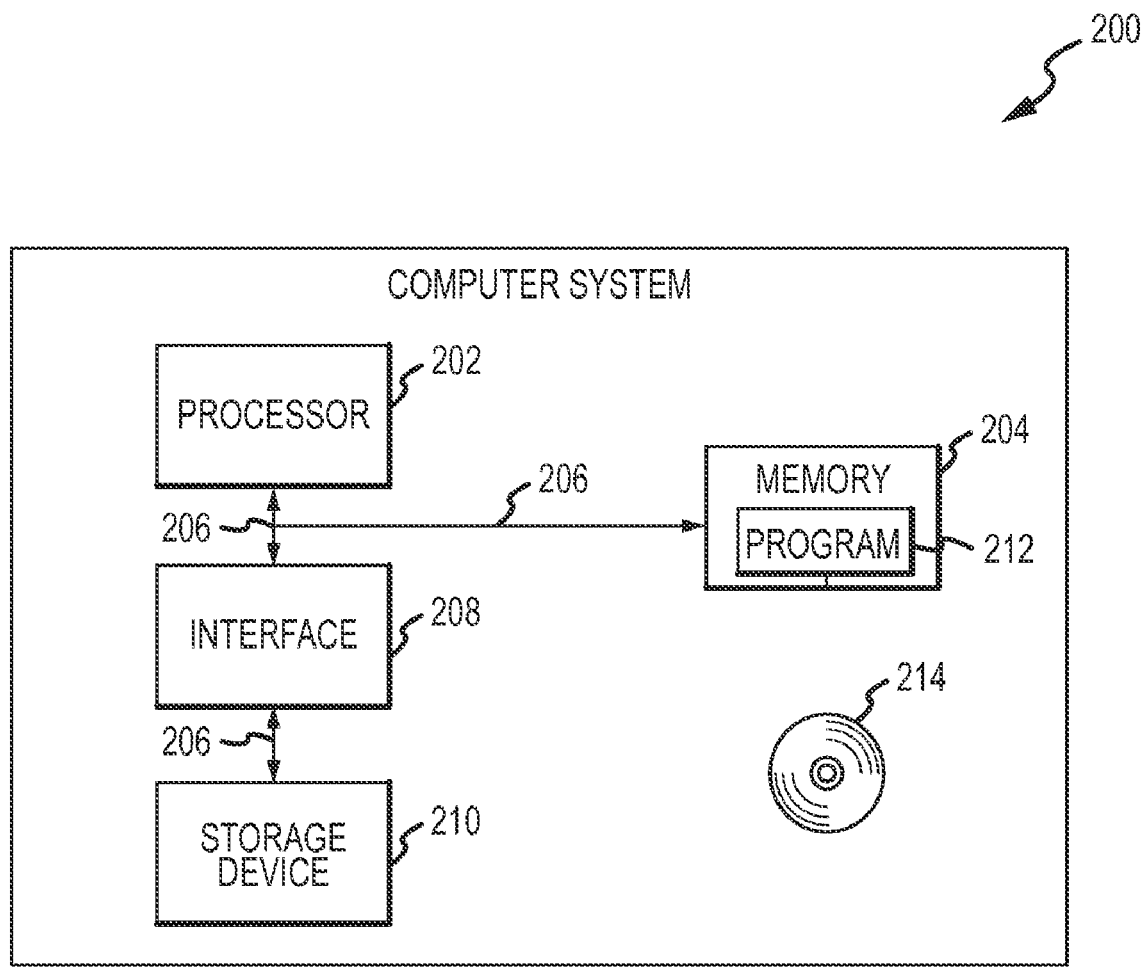
FIG. 2 is a functional block diagram of a computer system that can be implemented in connection with the control system of FIG. 1, in accordance with an exemplary embodiment of the present invention.

FIG. 2 is a functional block diagram of a computer system 200 for use in connection with the hybrid vehicle control system 100 of FIG. 1, and that can be used in implementing one or more processes for controlling braking in a hybrid vehicle, such as the control process described further below in connection with FIGS. 3 and 4. For example, in a preferred embodiment, the first and second computer systems 120, 122 of the brake controller 114 and the power train controller 116, respectively, of FIG. 1 may take the form of the exemplary computer system 200 of FIG. 2. Also, in a preferred embodiment, the computer system 200 is capable of having a software program product stored therein and/or executed thereby, for example to execute the control process described further below in connection with FIGS. 3 and 4. It will be appreciated that such processes and systems may also be implemented in connection with any one or more of a number of other different types of computer systems and/or other systems and/or devices.

In the depicted embodiment, the computer system 200 includes a processor 202, a memory 204, a bus 206, an interface 208, and a storage device 210. The processor 202 performs the computation and control functions of the computer system 200, and may comprise any type of processor or multiple processors, single integrated circuits such as a microprocessor, or any suitable number of integrated circuit devices and/or circuit boards working in cooperation to accomplish the functions of a processing unit. During operation, the processor 202 executes one or more programs 212 preferably stored within the memory 204 and, as such, controls the general operation of the computer system 200.

In one embodiment, the memory 204 stores a program or programs 212 that execute one or more embodiments of the control process of the present invention described below in connection with FIGS. 3 and 4. The memory 204 can be any type of suitable memory. The memory 204 may include one or more of various types of dynamic random access memory (DRAM) such as SDRAM, the various types of static RAM (SRAM), and the various types of non-volatile memory (PROM, EPROM, and flash). It should be understood that the memory 204 may be a single type of memory component, or it may be composed of many different types of memory components. In addition, the memory 204 and the processor 202 may be distributed across several different computers that collectively comprise the computer system 200. For example, a portion of the memory 204 may reside on a computer within a particular apparatus or process, and another portion may reside on a remote computer.

The bus 206 serves to transmit programs, data, status and other information or signals between the various components of the computer system 200. The bus 206 can be any suitable physical or logical means of connecting computer systems and components. This includes, but is not limited to, direct hard-wired connections, fiber optics, and infrared and wireless bus technologies.

The interface 208 allows communication to the computer system 200, for example from a system driver, the user interface 103 of the control system of FIG. 1, and/or another computer system, and can be implemented using any suitable method and apparatus. It can include one or more network interfaces to communicate with other systems or components. The interface 208 may also include one or more network interfaces to communicate with technicians, and/or one or more storage interfaces to connect to storage apparatuses, such as the storage device 210.

The storage device 210 can be any suitable type of storage apparatus, including direct access storage devices such as hard disk drives, flash systems, floppy disk drives and optical disk drives. In one exemplary embodiment, the storage device 210 comprises a program product from which memory 204 can receive a program 212 that executes one or more embodiments of one or more processes of the present invention, such as the control process described further below in connection with FIGS. 3 and 4 or a portion thereof. In another exemplary embodiment, the program product may be directly stored in and/or otherwise accessed by the memory 204 and/or a disk such as that referenced below. As shown in FIG. 2, the storage device 210 can comprise a disk drive device that uses disks 214 to store data. As one exemplary implementation, the computer system 200 may also utilize an Internet website, for example for providing or maintaining data or performing operations thereon.

It will be appreciated that while this exemplary embodiment is described in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks (e.g., disk 214), and transmission media such as digital and analog communication links. It will similarly be appreciated that the computer system 200 may also otherwise differ from the embodiment depicted in FIG. 2, for example in that the computer system 200 may be coupled to or may otherwise utilize one or more remote computer systems and/or other control systems.

Figure 3:
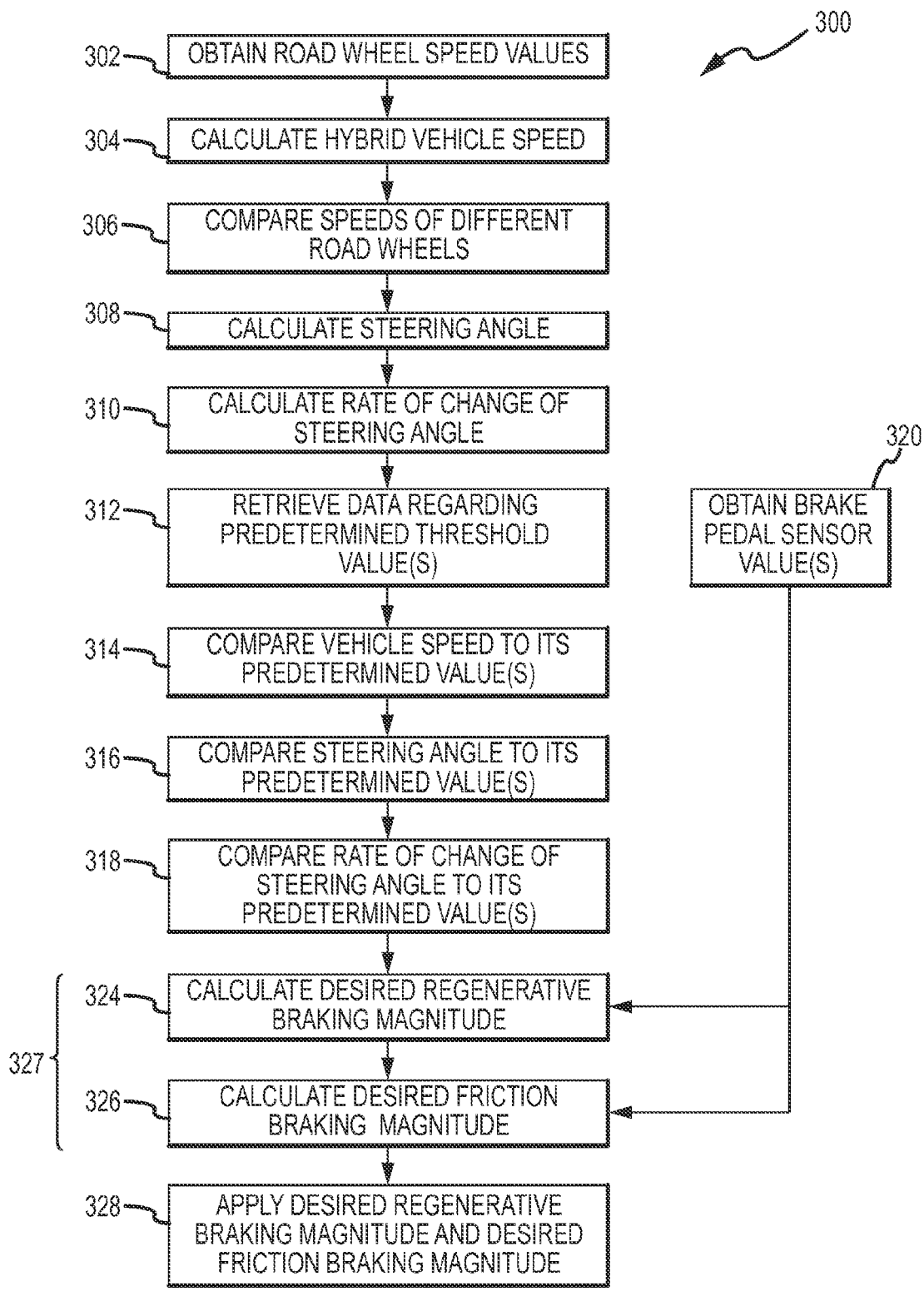
FIG. 3 is a flowchart of a control process for controlling braking in a hybrid vehicle, and that can be implemented in connection with the control system of FIG. 1 and the computer system of FIG. 2, in accordance with an exemplary embodiment of the present invention.

FIG. 3 is a flowchart of a control process 300 for controlling braking in a hybrid vehicle, in accordance with an exemplary embodiment of the present invention. The control process 300 can be implemented in connection with the control system 100 of FIG. 1 and/or the computer system 200 of FIG. 2, in accordance with an exemplary embodiment of the present invention.

As depicted in FIG. 3, the control process 300 begins with the step of obtaining road wheel speed values (step 302). In a preferred embodiment, values of road wheel speed are obtained from each of the road wheels 102 by a corresponding road wheel speed sensor 112 coupled thereto from the control system 100 of FIG. 1. Also in a preferred embodiment, the road wheel speed values are transmitted as third inputs 119 to the brake controller 114 of FIG. 1 for subsequent use by a processor of the first computer system 120 thereof in performing additional steps of the control process 300.

A speed of the hybrid vehicle is then calculated, based at least in part on the road wheel speed values (step 304). In a preferred embodiment, the speed of the hybrid vehicle is calculated based on an average of the road wheel speed values for some or all of the road wheels. However, this may vary in other embodiments. Also in a preferred embodiment, this calculation, and various other calculations, comparisons, determinations, and other actions of the control process 300 are conducted at least in part by the first computer system 120 of the brake controller 114 of FIG. 1, preferably by a processor thereof such as the processor 202 of FIG. 2.

The speeds of the different road wheels are compared with one another (step 306) and, based at least in part thereon, a steering angle (step 308) and a rate of change of the steering angle (step 310) are calculated for the hybrid vehicle. For example, in a preferred embodiment, respective speeds of two front road wheels 102 of FIG. 1 are compared with one another in determining both the steering angle and the rate of change thereof, based on known relationships between the speeds of the two front road wheels 102 when the hybrid vehicle is turning. In other embodiments, respective speeds of two rear road wheels 102 of FIG. 1 may be compared with one another in determining both the steering angle and the rate of change thereof, based on known relationships between the speeds of the two rear road wheels 102 when the hybrid vehicle is turning. In yet other embodiments, an average of the respective speeds of the left road wheels may be compared with an average of the respective speeds of the right road wheels. In still other embodiments, comparisons or calculations may be conducted and used with respect to diagonally-opposed road wheels, such as between a right, front road wheel versus a left, rear road wheel and/or between a left, front road wheel and a right, rear road wheel, among other possible variations. In a preferred embodiment, these calculations are conducted at least in part by the first computer system 120 of the brake controller 114 of FIG. 1, preferably by a processor thereof such as the processor 202 of FIG. 2.

Before, during or after steps 304, 308, and 310, data is retrieved regarding predetermined threshold values for the hybrid vehicle speed, the steering angle, and/or the rate of change of the steering angle (step 312). In a preferred embodiment, the data refers to predetermined threshold values used to determine whether regenerative braking alone, friction braking alone, or a combination of regenerative braking and friction braking is desired. Also in a preferred embodiment, the data is retrieved by the first computer system 120 of the brake controller 114 of FIG. 1. Specifically, in one such preferred embodiment, the data is retrieved by the processor 202 from the memory 204 of FIG. 2.

In certain embodiments, full regenerative braking may be desired for fuel economy purposes, but only provided that the hybrid vehicle speed and a steering angle and/or rate of change thereof are in acceptable ranges for regenerative braking (e.g., in which the steerability, stability, and smoothness of the hybrid vehicle will not be materially affected by full regenerative braking). Conversely, if the hybrid vehicle speed is too low or too high or the steering angle or rate of change thereof is too large, then friction braking alone may be desired. In addition, if the hybrid vehicle speed and/or the steering angle or rate of change thereof are in one or more intermediate ranges, then a combination of regenerative braking and friction braking may be desired.

For example, in one preferred embodiment, (i) friction braking alone is desired if the speed of the hybrid vehicle is less than a first predetermined threshold value or greater than a second predetermined threshold value, or if the steering angle or rate of change thereof is greater than a third predetermined threshold value; (ii) regenerative braking alone is desired if any of the following criteria are satisfied: the speed of the hybrid vehicle is between a fourth predetermined threshold value and a fifth predetermined threshold value and the steering angle or rate of change thereof is less than a sixth predetermined threshold value; and (iii) a combination of regenerative braking and friction braking is desired if either of the following conditions are satisfied: (a) the speed of the hybrid vehicle is between the first and fourth predetermined threshold values or between the second and fifth predetermined threshold values and the steering angle or rate of change thereof is less than the third predetermined threshold value, or (b) the steering angle or rate of change thereof is between the third and sixth predetermined threshold values and the speed of the hybrid vehicle is between the first and second predetermined threshold values.

The hybrid vehicle speed, steering angle, and/or rate of change of steering angle values are then compared with their respective predetermined threshold values (step 314, step 316, and step 318, respectively). In a preferred embodiment, these comparisons are conducted by the first computer system 120 of the brake controller 114 of FIG. 1, preferably by a processor thereof such as the processor 202 of FIG. 2. The combination of these variables may vary in other embodiments. For example, in certain embodiments, such comparisons may not be necessary for each of the hybrid vehicle speed, the steering angle, and/or the rate of change of the steering angle.

In addition, one or more brake pedal sensor values are obtained (step 320). For example, in one preferred embodiment, the brake pedal sensor values are obtained from the brake pedal travel sensor 106 and the brake pedal force sensor 108 of FIG. 1 based on a driver's engagement of the brake pedal 104 and the force applied by the driver against the brake pedal 104.

A desired regenerative braking magnitude and a desired friction braking magnitude are then calculated (step 324 and step 326, respectively) based at least in part on the brake pedal sensor values obtained in step 320 and the comparison of the hybrid vehicle speed, the steering angle, and/or the rate of change of the steering angle with their respective predetermined threshold values from steps 314-318. In a preferred embodiment, a desired total magnitude of braking is also determined during these steps and used in determining the desired regenerative and friction braking magnitudes. The sum of the desired regenerative braking and friction braking magnitudes is preferably equal to the desired total magnitude of braking. Accordingly, in such a preferred embodiment, the desired total magnitude of braking is effectively divided up between regenerative braking and friction braking based on the values of the hybrid vehicle speed and/or the steering angle and/or rate of change thereof.

For example, if the hybrid vehicle speed and/or the steering angle and/or rate of change thereof are both in acceptable ranges (e.g., in which the steerability, stability, and smoothness of the hybrid vehicle will not be materially affected by full regenerative braking), then preferably the regenerative braking magnitude is at least approximately equal to the desired total magnitude of braking, and little or no friction braking is used. Conversely, if the hybrid vehicle speed is either too high or too low or the steering angle and/or rate thereof is too high, then preferably the friction braking magnitude is at least approximately equal to the desired total magnitude of braking, and little or no regenerative braking is used. In addition, if the hybrid vehicle speed and/or the steering angle and/or rate of change thereof are in one or more intermediate ranges, then both regenerative braking and friction braking are applied, preferably with the sum of the regenerative braking magnitude and the friction braking magnitude equal to the desired total magnitude of braking.

In a preferred embodiment these calculations are conducted by the first computer system 120 of the brake controller 114 of FIG. 1, preferably by a processor thereof such as the processor 202 depicted in FIG. 2. The calculation of the desired regenerative and friction braking magnitudes in steps 324 and 326 are also referenced in FIG. 3 as a combined step 327, and will be described in greater detail further below in connection with FIG. 4 as such a combined step 327.

The desired regenerative and/or friction braking magnitudes are then applied to the hybrid vehicle (step 328). In a preferred embodiment, the desired regenerative and/or friction braking magnitudes are determined and incorporated into a signal, such as the brake control signal 121, by a processor of the first computer system 120 of the brake controller 114 of FIG. 1. Also, in a preferred embodiment, during regenerative braking the brake control signal 121 is transmitted to the power train controller 116 of FIG. 1, preferably to a processor of the second computer system 122 thereof, and is then implemented thereby during regenerative braking via the driveline 118 to ultimately influence the brake units 124 of FIG. 1. The brake controller 114 also applies friction braking when appropriate via one or more non-depicted rotors and calipers.

The control process 300 allows for selective application of regenerative braking and friction braking in varying amounts depending on the values of the hybrid vehicle speed and/or the steering angle and/or rate of change thereof. The control process 300 provides full regenerative braking under appropriate conditions, and tapers off regenerative braking by substituting friction braking as the hybrid vehicle speed value and/or the steering angle and/or rate of change thereof change. The control process 300, and the accompanying control system 100 of FIG. 1, computer system 200 of FIG. 2 and program products thereof, thus allow for improved stability, smoothness, and/or steerability of the hybrid vehicle in these situations. In addition, because road wheel speed sensors are utilized in a preferred embodiment, the control process 300 and the accompanying control system 100, computer system 200, and program products thereof of FIGS. 1 and 2 can be implemented using devices that satisfy current OBD-II requirements.

In one exemplary preferred embodiment, full regenerative braking is applied without friction braking if the steering angle is no greater than thirty degrees and the hybrid vehicle speed is in a range of from two miles per hour to seventy miles per hour. In this exemplary embodiment, full friction braking is applied without regenerative braking if the steering angle is greater than forty-five degrees or the hybrid vehicle speed is either less than two miles per hour (e.g., for improved smoothness) or greater than seventy miles per hour (e.g., for improved stability). Also in this exemplary embodiment, regenerative braking is linearly decreased to zero and replaced with friction braking if the steering angle is within an intermediate range of from thirty to forty-five degrees while the hybrid vehicle speed is in a range of from two miles per hour to seventy miles per hour. In addition, in this exemplary embodiment regenerative braking is quickly reduced to zero and replaced with friction braking if the hybrid vehicle speed is in one intermediate range slightly above (e.g., within approximately five miles per hour above, in one embodiment) two miles per hour or in another intermediate range slightly below above (e.g., within approximately five miles per hour below, in one embodiment) seventy miles per hour while the steering angle is no greater than forty-five degrees. In other embodiments, the values and/or variables used may vary.

It will be appreciated that certain steps of the control process 300 may vary from those depicted in FIG. 3 and/or described herein. For example, in certain embodiments, the braking control may be based at least in part on each of the hybrid vehicle speed, the steering angle, and the rate of change of the steering angle. In other embodiments, the braking control may be based on the hybrid vehicle speed and only one of the steering angle or rate of change thereof. In yet other embodiments, the braking control may be based on the hybrid vehicle speed and neither the steering angle nor the rate of change thereof. In still other embodiments, the braking control may be based on a steering angle value comprising one or both of the steering angle or the rate of change thereof but not on the hybrid vehicle speed. Other variables or combinations thereof may also be utilized. In addition, it will similarly be appreciated that certain steps of the control process 300 may be performed simultaneously or in a different order than that depicted in FIG. 3 and/or described herein, among other possible variations to the control process 300.

Figure 4:
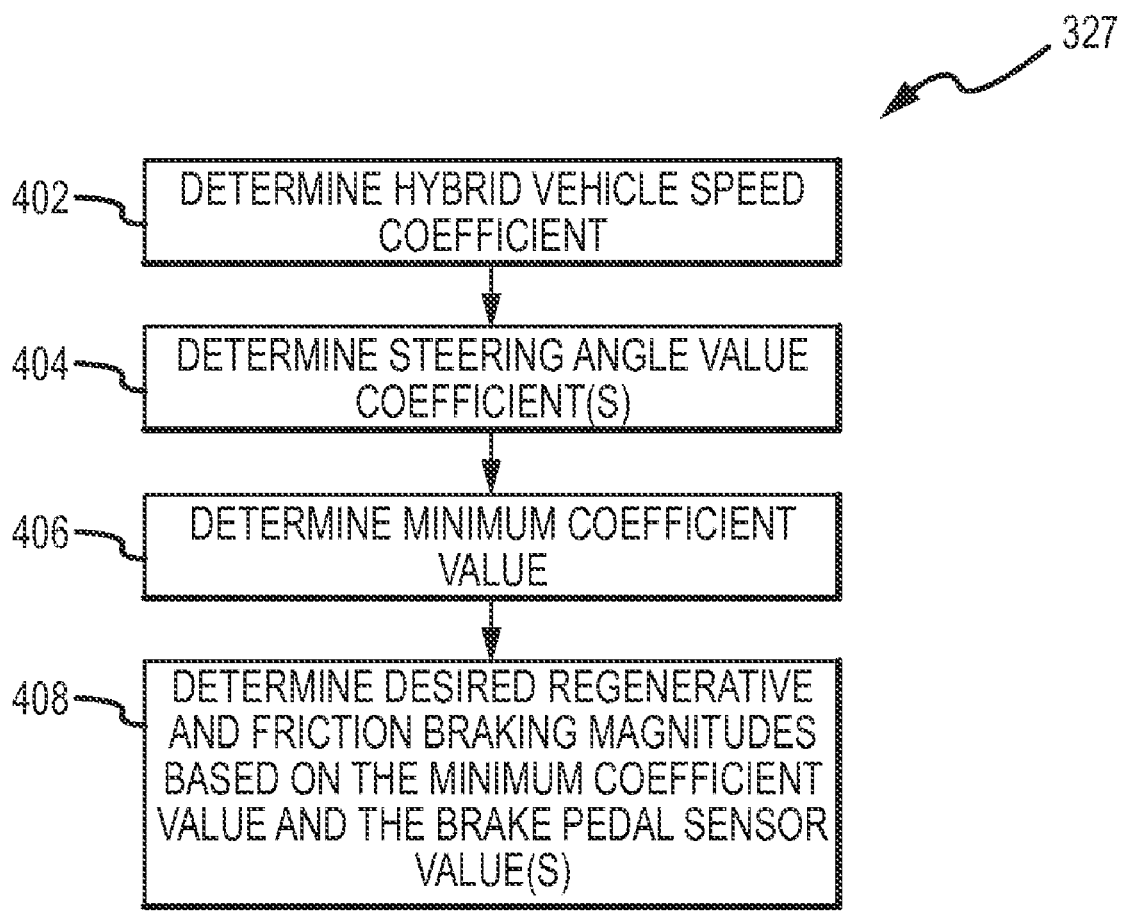
FIG. 4 is a flowchart of a combined step of the control process of FIG. 3, namely a combined step of calculating desired regenerative and friction braking magnitudes, in accordance with an exemplary embodiment of the present invention.

FIG. 4 is a flowchart of a combined step of the control process 300 of FIG. 3, namely the combined step 327 of calculating desired regenerative and friction braking magnitudes, in accordance with an exemplary embodiment of the present invention. In the depicted embodiment, the combined step 327 begins with the step of determining a hybrid vehicle speed coefficient (step 402). The hybrid vehicle speed coefficient is preferably a value between zero and one, inclusive, and represents a value that is indicative of how conducive the hybrid vehicle speed is for regenerative braking. In a preferred embodiment, the hybrid vehicle speed coefficient is determined from a look-up table stored in the first computer system 120 of the brake controller 114 of FIG. 4, for example in memory thereof. The look-up table provides a hybrid vehicle speed coefficient for a corresponding hybrid vehicle speed.

For example, if the hybrid vehicle speed is within an acceptable range (e.g., in which the steerability, stability, and smoothness of the hybrid vehicle will not be materially affected by full regenerative braking), then the hybrid vehicle speed coefficient is preferably at least substantially equal to one, meaning that the desired regenerative braking magnitude is at least substantially equal to the total desired braking magnitude based on the hybrid vehicle speed alone. Conversely, if the hybrid vehicle speed is too low or too high, then the hybrid vehicle speed coefficient is preferably at least substantially equal to zero, meaning that the desired friction braking magnitude is at least substantially equal to the total desired braking magnitude based on the hybrid vehicle speed alone. In addition, if the hybrid vehicle speed is in an intermediate range, then the hybrid vehicle speed coefficient is preferably somewhere between zero and one, meaning that a combination of both regenerative braking and friction braking is desired based on the hybrid vehicle speed alone. In a preferred embodiment, this determination is made at least in part by the first computer system 120 of the brake controller 114 of FIG. 1, preferably by a processor thereof such as the processor 202 of FIG. 2.

In addition, a steering angle value coefficient is also determined (step 404), based on one or more steering angle values such as a steering angle and/or rate of change of a steering angle of the hybrid vehicle. The steering angle value coefficient is preferably a value between zero and one, inclusive, and represents a value that is indicative of how conducive the steering angle value is for regenerative braking. In a preferred embodiment, the steering angle value coefficient is determined from a look-up table stored in the first computer system 120 of the brake controller 114 of FIG. 4, for example in memory thereof. The look-up table provides a steering angle value coefficient for a corresponding steering angle and/or a rate of change of the steering angle.

For example, if the steering angle value is within an acceptable range (e.g., in which the steerability, stability, and smoothness of the hybrid vehicle will not be materially affected by full regenerative braking), then the steering angle value coefficient is preferably at least substantially equal to one, meaning that the desired regenerative braking magnitude is at least substantially equal to the total desired braking magnitude based on the steering angle value alone. Conversely, if the steering angle value is too large (for example, during a sharp turn), then the steering angle value coefficient is preferably at least substantially equal to zero, meaning that the desired friction braking magnitude is at least substantially equal to the total desired braking magnitude based on the steering angle value alone. In addition, if the steering angle value is in an intermediate range, then the steering angle value coefficient is preferably somewhere between zero and one, meaning that a combination of both regenerative braking and friction braking is desired based on the steering angle value alone. In a preferred embodiment, this determination is made by a processor using a look-up table stored in memory, preferably by the first computer system 120 of the brake controller 114 of FIG. 1.

A minimum coefficient value is then determined (step 406). In a preferred embodiment, the minimum coefficient value is determined to be the smaller of the hybrid vehicle speed coefficient and the steering angle value coefficient. In other embodiments this may vary. For example, in certain embodiments, a weighted average of the hybrid vehicle speed coefficient and the steering angle value coefficient, and/or one or more other measures, may be utilized. In a preferred embodiment, this determination is made at least in part by the first computer system 120 of the brake controller 114 of FIG. 1, preferably by a processor thereof such as the processor 202 of FIG. 2.

Determinations are then made as to desired regenerative and friction braking magnitudes (step 408). In the depicted embodiment, the desired regenerative and friction braking magnitudes are determined based on the minimum coefficient value determined in step 406 and the brake pedal sensor values determined in step 320 of FIG. 3. Specifically, in a preferred embodiment, the minimum coefficient value is multiplied by a desired total braking magnitude, such as that described in connection with FIG. 3 above, in order to determine the desired regenerative braking magnitude. The desired total braking magnitude may be determined, for example, using brake pedal travel data and brake pedal force data from the brake pedal travel sensor 106 and the brake pedal force sensor 108, respectively, of FIG. 8 along with one or more look-up tables correlating such brake pedal travel data and brake pedal force data with an amount of braking desired by the driver. The desired friction magnitude can then be determined by subtracting the desired regenerative braking magnitude by the desired total braking magnitude, in accordance with an exemplary embodiment of the present invention. In a preferred embodiment, this determination is also made at least in part by the first computer system 120 of the brake controller 114 of FIG. 1, preferably by a processor thereof such as the processor 202 of FIG. 2.

Similar to the discussion above in connection with FIG. 3, it will be appreciated that the steps of the combined step 327 of FIG. 4 may also vary. For example, in certain embodiments, a hybrid vehicle speed may be used without a steering angle value, or vice versa, and/or multiple steering angle values may be used (such as for a steering angle and a rate of change thereof). It will similarly be appreciated that other variations may occur, for example in that certain steps my not only differ but may also be conducted simultaneously and/or in a different order than that depicted in FIG. 4 or described herein.

Accordingly, an improved method is provided for controlling braking in a hybrid vehicle, for example during sharp turns or during periods of very slow or very fast speeds. In addition, an improved program product is provided for controlling braking in a hybrid vehicle, for example during sharp turns or during periods of very slow or very fast speeds. An improved system is also provided for controlling braking in a hybrid vehicle, for example during sharp turns or during periods of very slow or very fast speeds. The improved method, program product, and system provide for potentially improved steerability, stability, and/or smoothness in hybrid vehicles while still maintaining benefits of fuel efficiency through optimal uses of regenerative and friction braking. Furthermore, the improved method, program product, and system can be implemented using OBD-II compliant devices, such as the road wheel speed sensors described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A method for controlling braking in a hybrid vehicle, the method comprising the steps of:
   determining a speed of the hybrid vehicle using a processor; and
   applying regenerative braking for the hybrid vehicle if the speed of the hybrid vehicle is greater than a first predetermined threshold value and less than a second predetermined threshold value.

2. The method of claim 1, wherein the step of applying regenerative braking comprises the step of:
   applying regenerative braking for the hybrid vehicle only if the speed of the hybrid vehicle is between the first predetermined threshold value and the second predetermined threshold value.

3. The method of claim 1, further comprising the steps of:
   applying friction braking if the speed of the hybrid vehicle is less than the first predetermined threshold value or greater than the second predetermined threshold value;
   applying regenerative braking if the speed of the hybrid vehicle is between a third predetermined threshold value and a fourth predetermined threshold value; and
   applying regenerative braking and friction braking if the speed of the hybrid vehicle is between the first and third predetermined threshold values or between the fourth and second predetermined threshold values.

4. The method of claim 3, further comprising the step of:
   determining a desired total magnitude of braking;
   wherein the step of applying regenerative braking and friction braking comprises the step of applying regenerative braking with a regenerative braking magnitude and friction braking with a friction braking magnitude, the regenerative and friction braking magnitudes based at least in part on the speed of the hybrid vehicle.

5. A method for controlling braking in a hybrid vehicle, the method comprising:
   determining a rate of change of a steering angle of the hybrid vehicle using a processor; and
   applying regenerative braking based at least in part on the value of the rate of change of the steering angle.

6. The method of claim 5, wherein the step of applying regenerative braking comprises applying regenerative braking if the rate of change of the steering angle is less than a first predetermined threshold value.

7. The method of claim 6, further comprising:
   applying friction braking if the rate of change of the steering angle is greater than a second predetermined threshold value; and
   applying regenerative braking and friction braking if the rate of change of the steering angle is between the first and second predetermined threshold values.

8. The method of claim 5, further comprising:
   determining a speed of the hybrid vehicle;
   applying friction braking if the speed of the hybrid vehicle is less than a first predetermined threshold value or greater than a second predetermined threshold value, or if the rate of change of the steering angle is greater than a third predetermined threshold value;

applying regenerative braking if the speed of the hybrid vehicle is between a fourth predetermined threshold value and a fifth predetermined threshold value and the rate of change of the steering angle is less than a sixth predetermined threshold value; and applying regenerative braking and friction braking if either of the following conditions are satisfied:
(a) the speed of the hybrid vehicle is between the first and fourth predetermined threshold values or between the second and fifth predetermined threshold values and the rate of change of the steering angle is less than the third predetermined threshold value; or
(b) the rate of change of the steering angle is between the third and sixth predetermined threshold values and the speed of the hybrid vehicle is between the first and second predetermined threshold values.

9. The method of claim 8, further comprising:
determining a desired total magnitude of braking; and
applying regenerative braking with a regenerative braking magnitude and friction braking with a friction braking magnitude, the regenerative and friction braking magnitudes based at least in part on the speed of the hybrid vehicle, the rate of change of the steering angle, and the desired total magnitude of braking, if either of the following conditions are satisfied:
(a) the speed of the hybrid vehicle is between the first and fourth predetermined threshold values or between the second and fifth predetermined threshold values and the rate of change of the steering angle is less than the third predetermined threshold value; or
(b) the rate of change of the steering angle is between the third and sixth predetermined threshold values and the speed of the hybrid vehicle is between the first and second predetermined threshold values.

10. The method of claim 9, wherein the hybrid vehicle includes a plurality of wheels and the method further comprises:
determining a first wheel speed of a first wheel of the plurality of wheels;
determining a second wheel speed of a second wheel of the plurality of wheels;
determining the speed of the hybrid vehicle based at least in part on the first wheel speed, the second wheel speed, or both; and
determining the rate of change of the steering angle based at least in part on the first wheel speed and the second wheel speed.

11. A system for controlling braking in a hybrid vehicle, the system comprising:
a sensor configured to at least facilitate determining a value of a variable pertaining to operation of the hybrid vehicle, the variable comprising a speed of the hybrid vehicle, a steering angle of the hybrid vehicle, or a rate of change of the steering angle; and
a brake controller configured to at least facilitate:
applying regenerative braking if the value of the variable is less than a first predetermined threshold value;
applying friction braking if the value of the variable is greater than a second predetermined threshold value; and
applying regenerative braking and friction braking if the value of the variable is between the first and second predetermined threshold values.

12. The system of claim 11, wherein the hybrid vehicle includes a plurality of wheels, and the system further comprises:
a first sensor coupled to a first wheel of the plurality of wheels and configured to at least facilitate determining a first wheel speed of the first wheel; and
a second sensor coupled to a second wheel of the plurality of wheels and configured to at least facilitate determining a second wheel speed of the second wheel;
wherein the brake controller is configured to at least facilitate:
determining the speed of the hybrid vehicle based at least in part on the first wheel speed, the second wheel speed, or both; and
determining a steering angle value based at least in part on the first wheel speed and the second wheel speed, the steering angle value comprising the steering angle or the rate of change of the steering angle.

13. The system of claim 12, wherein the brake controller is configured to at least facilitate:
applying friction braking if the speed of the hybrid vehicle is less than a first predetermined threshold value or greater than a second predetermined threshold value, or if the steering angle value is greater than a third predetermined threshold value;
applying regenerative braking if the speed of the hybrid vehicle is between a fourth predetermined threshold value and a fifth predetermined threshold value and the steering angle value is less than a sixth predetermined threshold value; and
applying regenerative braking and friction braking if either of the following conditions are satisfied:
(a) the speed of the hybrid vehicle is between the first and fourth predetermined threshold values or between the second and fifth predetermined threshold values and the steering angle value is less than the third predetermined threshold value; or
(b) the steering angle value is between the third and sixth predetermined threshold values and the speed of the hybrid vehicle is between the first and second predetermined threshold values.

14. The system of claim 13, further comprising:
an interface configured to at least facilitate determining a desired total magnitude of braking;
wherein the brake controller is configured to at least facilitate:
applying regenerative braking with a regenerative braking magnitude and friction braking with a friction braking magnitude, the regenerative and friction braking magnitudes based at least in part on the speed of the hybrid vehicle, the steering angle value, and the desired total magnitude of braking, if either of the following conditions are satisfied:
(a) the speed of the hybrid vehicle is between the first and fourth predetermined threshold values or between the second and fifth predetermined threshold values and the steering angle value is less than the third predetermined threshold value; or
(b) the steering angle value is between the third and sixth predetermined threshold values and the speed of the hybrid vehicle is between the first and second predetermined threshold values.

15. The system of claim 11, further comprising:
a plurality of brake units;
a driveline coupled to the plurality of brake units; and
a power train controller coupled between the brake controller and the driveline and configured to at least facilitate applying regenerative braking via the driveline to the plurality of brake units based at least in part on a brake control signal;
wherein the brake controller is configured to at least facilitate:
determining the brake control signal based at least in part on the value of the variable; and
transmitting the brake control signal to the power train controller.

* * * * *